US010699265B2

(12) United States Patent
Urquhart

(10) Patent No.: US 10,699,265 B2
(45) Date of Patent: Jun. 30, 2020

(54) ON-LINE PAY-PER-USE SYSTEM AND METHOD

(71) Applicant: Albert Bruce Urquhart, Boynton Beach, FL (US)

(72) Inventor: Albert Bruce Urquhart, Boynton Beach, FL (US)

( * ) Notice: Subject to any disclaimer, the term of this patent is extended or adjusted under 35 U.S.C. 154(b) by 201 days.

(21) Appl. No.: 15/895,563

(22) Filed: Feb. 13, 2018

(65) Prior Publication Data
US 2018/0253719 A1  Sep. 6, 2018

Related U.S. Application Data

(63) Continuation of application No. 14/597,615, filed on Jan. 15, 2015, now Pat. No. 9,940,617, which is a continuation of application No. 13/150,338, filed on Jun. 1, 2011, now Pat. No. 8,965,781.

(60) Provisional application No. 61/396,653, filed on Jun. 1, 2010.

(51) Int. Cl.
| G06Q 20/20 | (2012.01) |
| G06Q 20/32 | (2012.01) |
| D06F 33/00 | (2020.01) |
| G06Q 20/10 | (2012.01) |
| G06Q 20/40 | (2012.01) |
| G07F 17/00 | (2006.01) |
| H04W 4/80 | (2018.01) |
| G06Q 30/00 | (2012.01) |
| G06Q 10/00 | (2012.01) |

(52) U.S. Cl.
CPC ......... *G06Q 20/3278* (2013.01); *D06F 33/00* (2013.01); *G06Q 10/20* (2013.01); *G06Q 20/10* (2013.01); *G06Q 20/20* (2013.01); *G06Q 20/202* (2013.01); *G06Q 20/3226* (2013.01); *G06Q 20/4037* (2013.01); *G06Q 30/00* (2013.01); *G07F 17/0042* (2013.01); *H04W 4/80* (2018.02)

(58) Field of Classification Search
CPC ...... G06Q 20/10; G06Q 20/20; G06Q 20/202; G06Q 30/0284; G06F 15/16
See application file for complete search history.

(56) References Cited

U.S. PATENT DOCUMENTS

| 5,844,808 | A  | 12/1998 | Konsmo et al. |
| 6,356,881 | B1 | 3/2002  | Milch et al. |
| 7,216,514 | B2 | 5/2007  | Sakita et al. |
| 8,965,781 | B2 | 2/2015  | Urquhart |

(Continued)

OTHER PUBLICATIONS

Kelly, B., "Car wash payment options increase with recent technological advance", National Petroleum News, vol. 90, No. 12, pp. 54-56, Accession No. 01728707, (Nov. 1998).

*Primary Examiner* — Florian M Zeender
*Assistant Examiner* — Milena Racic
(74) *Attorney, Agent, or Firm* — McHale & Slavin, P.A.

(57) ABSTRACT

Aspects of the invention may involve systems, methods, and computer readable medium. In an embodiment of the invention, a computer-implemented method for paying for usage of a pay per use device may be provided. The method may transmit device identification information from the device to a server. Device setup information and vend price may be received and the vend price may be displayed. User identification may be received and transmitted to the server. An account balance value may be received and displayed on the display. A start request may be received and transmitted to the server. The device may start and an updated account balance may be displayed.

19 Claims, 12 Drawing Sheets

(56) References Cited

U.S. PATENT DOCUMENTS

| | | |
|---|---|---|
| 2002/0099608 A1 | 7/2002 | Pons et al. |
| 2003/0109938 A1 | 6/2003 | Daum et al. |
| 2004/0059693 A1 | 3/2004 | Hausen et al. |
| 2004/0068434 A1 | 4/2004 | Kanekon |
| 2005/0108326 A1 | 5/2005 | Tuttle |
| 2007/0174112 A1 | 7/2007 | Thorson |
| 2010/0228667 A1 | 9/2010 | Kalwani et al. |

400

```
        Serial number: 1953326444-65
       Software version V1.4.3-20110423
                 802.15.4 Menu
=========================================
```

- 410  j.....Server Communication Test
- 420  m.....Menu
- 430  P.....Ping All Nodes
- 440  p.....Ping a node
- 450  R.....Reset BOW
- 460  v.....Reader Firmware Version
- 470  X.....Max TX Power
- 480  w.....Clear Reader EEPROM

900

| Field name | Field value | Field position (bytes) | Field size (bytes) |
|---|---|---|---|
| 910 Key press wait time | 25 (sec) | 1 | 1 |
| 920 Cycle vend price | $1.40 | 2 | 1 |
| 930 Cycle length | 20 (sec) | 6 | 1 |

940  5.3.2 TOPLOAD WASHER PROGRAMMING DATA PACKET
Programming Data Packet
Byte 1: STX
Byte 2: Number of bytes in Data Field = 43
Byte 3: Programming Data = 0x21
Byte 4-5: Vend Price
Byte 6-7: Coin #1 Value (control will ignore this field)
Byte 8-9: Coin #2 Value (control will ignore this field)
Byte 10-11: Start Pulse Value
Byte 12: Cycle Length
Byte 13: Control Configuration (see Section 6.2)
Byte 14: Default Cycle
Byte 15-45: unused
Byte 46: BCC
Note: Unused bytes should be set to zero

FIG. 9

ON-LINE PAY-PER-USE SYSTEM AND METHOD

CROSS REFERENCE TO RELATED APPLICATIONS

This application is a continuation of U.S. patent application Ser. No. 14/597,615 filed on Jan. 15, 2015, which is a continuation of U.S. patent application Ser. No. 13/150,338, filed on Jun. 1, 2011, now U.S. Pat. No. 8,965,781, issued Feb. 24, 2015, which claims priority to U.S. Provisional Application No. 61/396,653, filed on Jun. 1, 2010. U.S. patent application Ser. No. 13/150,338 and U.S. Provisional Application No. 61/396,653 are hereby incorporated by reference in their entirety.

FIELD OF INVENTION

The present invention relates to pay-per-use devices and more specifically to network based pay-per-use devices.

BACKGROUND

Pay-per-use devices, such as those found in Laundromats may rely primarily on cash (e.g., coins and bills) as the payment method. Reliance on bills and coins may require additional servicing of bill and coin readers as well as scheduled collection of generated revenues. Fraud may occur through the use of slugs or other tokens in the coin slots. To counteract acceptance of fraudulent bills, bill readers may be highly sensitive such that worn bills may not be acceptable.

SUMMARY

Aspects of the invention may involve systems, methods, and computer readable medium. In one embodiment of the invention, an online method to pay for usage of a pay per use device may include: transmitting device identification information via a communications circuit associated with the device; receiving device setup information and vend price via the communications circuit; receiving by a user interface circuit or device in communication with an RF reader, a calculated vend price based on the customer selected vending options and one or more pricing tables stored on the RF reader, machine and internet server; displaying the vend price via a display screen associated with the device; receiving a user identification via a reader associated with the device; transmitting the user identification via the communications circuit; receiving an account balance value based on the user identification via the communications circuit; displaying the account balance via the display screen; receiving a start request via a user interface circuit; transmitting the start request via the communication circuit; receiving an updated account balance value via the communication circuit; displaying the updated account balance via the display screen; and enabling operation of the device by the reader in response to the start request.

In another embodiment, a pay-per-use system may include: a microprocessor coupled to a pay-per-use device; a reader electrically coupled to the microprocessor, the reader operable to receive user data; a communications circuit electrically coupled to the microprocessor, the communications circuit operable to transmit the user data, pay-per-use device data, and a user start request, the communication circuit operable to receive pay-per-use device setup data, user account information, and a start command; a display screen electrically coupled to the microprocessor, the display screen operable to display the user account information; a user interface circuit electrically coupled to the microprocessor, the user interface circuit operable to receive the user start request; and a start circuit electrically coupled to the microprocessor, the start circuit operable to enable operation of the pay-per-use device in response to the start command.

In another embodiment, a payment verification for a pay-per-use device may include a server coupled to the internet, wherein the server comprises a processor adapted to: store funds in a user account associated with a user; receive device information; receive user data associated with the user; determine whether the user account has a sufficient fund value; deduct the vend price from the user account; and transmit a start command.

In yet another embodiment of the invention, an online method for usage of a plurality of pay-per-use devices may include: receiving user information via a computer system; storing funds in an account associated with the user information via the computer system; receiving pay-per-use device information via the computer system; transmitting a value of the account via the computer system; determining a cost of operation based on the pay-per-use device information via the computer system; transmitting the cost of operation via the computer system; receiving a start indication via the computer system; determining whether the account has a sufficient fund value based on the cost of operation via the computer system; transmitting a start command via the computer system; deducting the cost of operation from the account via the computer system; and transmitting the account balance after the cost of operation is deducted from the account by the computer system.

BRIEF DESCRIPTION OF THE DRAWINGS

The foregoing and other features and advantages of the invention will be apparent from the following, more particular description of various embodiments, as illustrated in the accompanying drawings wherein like reference numbers generally indicate identical, functionally similar, and/or structurally similar elements. The first digits in the reference number indicate the drawing in which an element first appears.

FIG. 9 depicts example reader setup data that may be used in an illustrative embodiment;

DESCRIPTION OF THE EMBODIMENTS

Figure 1:
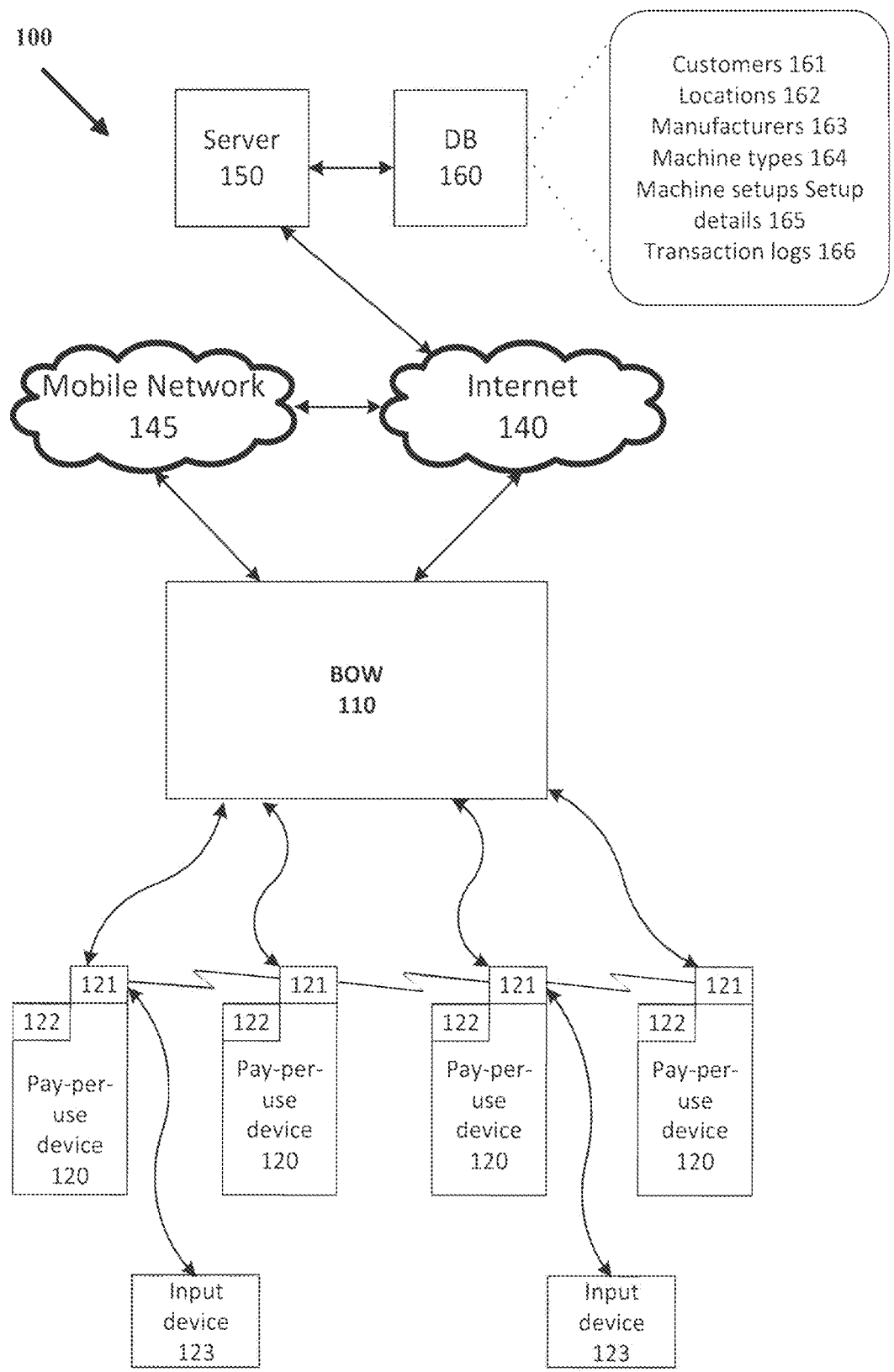
FIG. 1 is a block diagram depicting an illustrative high-level device processing system for use with an illustrative embodiment for providing online pay-per-use devices.

Illustrative embodiments are discussed in detail below. While specific embodiments are discussed, it should be understood that this is done for illustration purposes only. In describing and illustrating the embodiments, specific terminology is employed for the sake of clarity. However, the embodiments are not intended to be limited to the specific terminology so selected. A person skilled in the relevant art will recognize that other components and configurations may be used without departing from the spirit and scope of the embodiments. It is to be understood that each specific element includes all technical equivalents that operate in a similar manner to accomplish a similar purpose. The examples and embodiments described herein are non-limiting examples.

All publications cited herein are hereby incorporated by reference in their entirety.

As used herein, the term "a" refers to one or more. The terms "including," "for example," "such as," "e.g.," "may be" and the like, are meant to include, but not be limited to, the listed examples. The term "product" may refer to both products and services.

Overview

Pay-per-use devices may be used, for example, in the commercial laundry and parking industries. The commercial laundry industry may be divided into three parts. The first is referred to as the "route" business, which may involve leasing space from building owners and/or property management companies, installing and servicing laundry equipment, and/or collecting revenues generated from laundry machines. The second business area may be the 'Store' or 'Laundromat' business where commercial and/or industrial laundry equipment may be provided to coin laundry storeowners and on-premise laundry facilities. The third area of business may be where laundry machines and/or other household appliances are rented to property owners, managers of multi-family housing properties, individuals and/or corporate entities. The route and store business areas may comprise approximately 4 million installed machines divided equally between route and store.

The parking industry may be divided into two primary areas. First, on-street parking (e.g., meters). Second, off-street parking such as parking garages and lots. In the parking industry, the pay-per-use devices may be the parking meters and the terminals at the entry and exits of parking garages and lots, for example.

Coins may be predominant in these industries although there has been a desire to replace coins for many years. Alternatives to coins may include smart cards, tokens and some online Point of Sale (POS) terminals having card reloading capabilities.

In the smart card alternative, a laundry stored value card account system may exist where a value (e.g., a monetary amount) may be stored on a smart card. When the card is inserted into the reader the 'vend price' may be deducted from the card memory and the software commands the machine to start. The card is loaded or reloaded at a station or terminal within the laundry facility by inserting the card into a terminal. A user simply follows the instructions to insert a credit/debit card and transfer an amount to the card. A bill acceptor terminal available in the laundry room may provide a cash option. In some cases a user may travel to a local convenience store that has the appropriate terminal capable of loading their laundry card, for example.

In one embodiment, an online pay-per-use system may exist where a user may be identified with an online account. The online account may be associated with an account that may have deposited funds. Pay-per-use devices may contain readers with integrated radio transceivers that may communicate with a concentrator that may be connected to the internet. When the user activates a pay-per-use device, the user's online account may be deducted by a determined amount.

Users may register in the system to establish an account. They may add money to their account via cash, check or credit card or a call center may allow the transaction with pre-approved credit.

Illustrative Systems

FIG. 1 depicts an illustrative high-level device processing system 100 for use with an illustrative embodiment for providing online pay-per-use devices. FIG. 1 may depict a high-level operational view of an embodiment of a wireless online pay-per-use system. In the case of online commercial laundry, for example, an objective may be to start a washer or dryer by having an account on a server with sufficient funds in it to start the machine cycle.

High-level pay-per-use device processing system 100 may include input device 123, pay-per-use device 120, reader 121, display 122, box on the wall (BOW) 110 (e.g., a concentrator), internet 140 (e.g., wide area network (WAN), local area network (LAN) or other network), mobile network 145, server 150, and/or database 160. Database 160 may include data such as tables for customers 161, locations 162, manufacturers 163, machine types 164, machine setups 165, setup details 166, transaction logs 167, maintenance, etc.

Input device 123 may include a radio frequency (RF) card, keyboard, keypad, mobile device (e.g., mobile phone, iPad, Blackberry, etc.) and/or text messaging device. Input device 123 may also include a cash add-value terminal or station. Input device 123 may be coupled (e.g., wired or wirelessly) to pay-per-use device 120 via reader 121.

Pay-per-use device 120 may include a washer, dryer, parking meter, or other device that payment may be required for operation. Pay-per-use device 120 may be connected (e.g., wired or wirelessly) to reader 121 and display 122.

Reader 121 may receive user data from input device 123. User data received from input device 123 may be used to identify a user account, for example. Reader 121 may be connected with other readers in a 'mesh' network arrangement, for example, so that reader 121 can communicate with other readers. Reader 121 may also communicate with BOW 110. Reader 121 communication methods may be wired and/or wireless.

Display 122 may be connected to pay-per-user device 120. Display 122 may be used to communicate data to the user (e.g., user feedback). For example, display 122 may present a vend price (e.g., $1.50), account balance, and/or other system to user communications. Display 122 may present information visually to the user via, for example, an LED or LCD display. Display 122 may also present audible information to the user via, for example, speakers. Display 122 may also present tactile feedback to the user via, for example, a refreshable Braille display. Display 122 may contain a start button. The start button may include a light emitting device to alert a user. The start button may enable the user to provide a signal to begin operation of pay-per-use device 120. The start button may also be separate from display 122.

BOW 110 may be a concentrator including a microcontroller which may format multiple data streams from reader 121 to comply with transmission protocols (e.g., TCP/IP, HTTP, etc.). For example, data from reader 121 may be formatted as HTML to facilitate transmission through the internet to server 150, for example. BOW 110 may be connected (e.g., wirelessly or wired) to one or more readers 121, mobile network 145, and/or internet 140. BOW 110 may act as a concentrator for one or more readers 121. BOW 110 may be connected to server 150 through internet 140 and/or mobile network 145. BOW 110 may connect to internet 140 through, for example, a digital subscriber line (DSL), cable modem, Wi-Fi, satellite, telephone modem, etc. BOW may also connect to mobile network 145. BOW 110 may transmit and receive data from/to one or more readers 121 and/or server 150 using communication protocols that support and/or provide authentication, encryption, and/or authorization such as: TCP/IP, 802.15.4, high rate WPAN, low rate WPAN, 6loWPAN, ISA100.11a, 802.11.1, Wi-Fi, 3G, WiMAX, 4G and/or other communication protocols.

Mobile network 145 may include networks that support and/or provide authentication, encryption, and/or authorization such as: a cellular network (e.g., Global System for Mobile Communications (GSM), General Packet Radio Service (GPRS), Code Division Multiple Access (CDMA), Evolution-Data Optimized (EV-DO), Enhanced Data Rates for GSM Evolution (EDGE), etc.), satellite, WiMAX, ultra-broadband, a third generation network, a fourth generation network, or other mobile network. BOW 110 may use mobile network 145 as a primary communication method or as a backup method when communication with internet 140 cannot be established, for example.

Server 150 may be an application server capable of running an application, storing data, and sending and receiving data. Server 150 may be on a local computer (e.g., running on a dedicated computer) or hosted by a hosting service. Server 150 may be connected to or running database 160. In one embodiment, server 150 may be built using Microsoft ASP.net, Internet Information System (IIS), WCF (Windows Communications Foundation) Data Services, and SQL, for example. Server 150 may be the controller of transactions relating to functions performed by reader 121.

Database 160 may be a relational SQL database and may contain data used by server 150. Database 160 may contain customer data 161, location data 162, manufacturer data 163, machine type data 164, machine setup data 165, setup detail data 166, and/or transaction logs 167.

Customer data 161 may contain customer name, address, contact number and account serial number. Location data 162 may contain a list of all locations within a service operator's area. Manufacturer data 163 may contain the manufacturer of the pay-per-use device 120. Machine type data 164 may contain the type of pay-per-use device 120 (e.g., washer, dryer, parking meter etc). Machine setup data 165 may contain setup data (e.g., vend price, device cycle time, key press wait time, temperature, etc.) for each machine type. Transaction logs 167 may contain log data for transactions.

In one embodiment, input device 123 may be a keypad allowing a user to key in an account number followed by a pin, for example. Alternatively, a user may scan a number, bar, or 'Q' code on reader 121 identifying the machine, add their user account number and/or 'text" a message with a request for pay-per-use device 120 to start.

Data transmitted from input device 123 may be received by reader 121. Reader 121 may interrogate the input data and may send a data packet wirelessly via ISO 805.14.1, for example, to BOW 110.

BOW 110 may record which reader 121 the data packet came from and may repackage the data packet for transmission over internet 140 or mobile network 145 to server 150. Repackaging may include formatting the data packet for a particular protocol specification (e.g., adding XML tags).

Server 150 may interrogate the received data and may access a user's account through, for example, relational database 160. Server 150 may determine if sufficient funds are in the user account to satisfy the vend price to start pay-per-use device 120. If funds are sufficient server 150 may return a command through BOW 110 to reader 120. Reader may change display 122 and, for example, a start button may become active to enable a user to start pay-per-use device 120.

A user may press the start button, for example, on display 122 which may send a command to server 150 to deduct the vend price from the customer account and return a "start machine" command to reader 121. The reader may command pay-per-use device 120 to start and may show the cycle time decrementing on display 122, for example. Reader 121 may record transaction details, for example, and may send this data back to server 150 which may then be sent to transaction logs 166 in database 160.

In another embodiment, the signal to start the pay-per-use device 120 is sent during the initial use of input device 120. In this scenario, no additional start command is needed by the user. In another embodiment, the start button may be separate from display 122.

Figure 2:
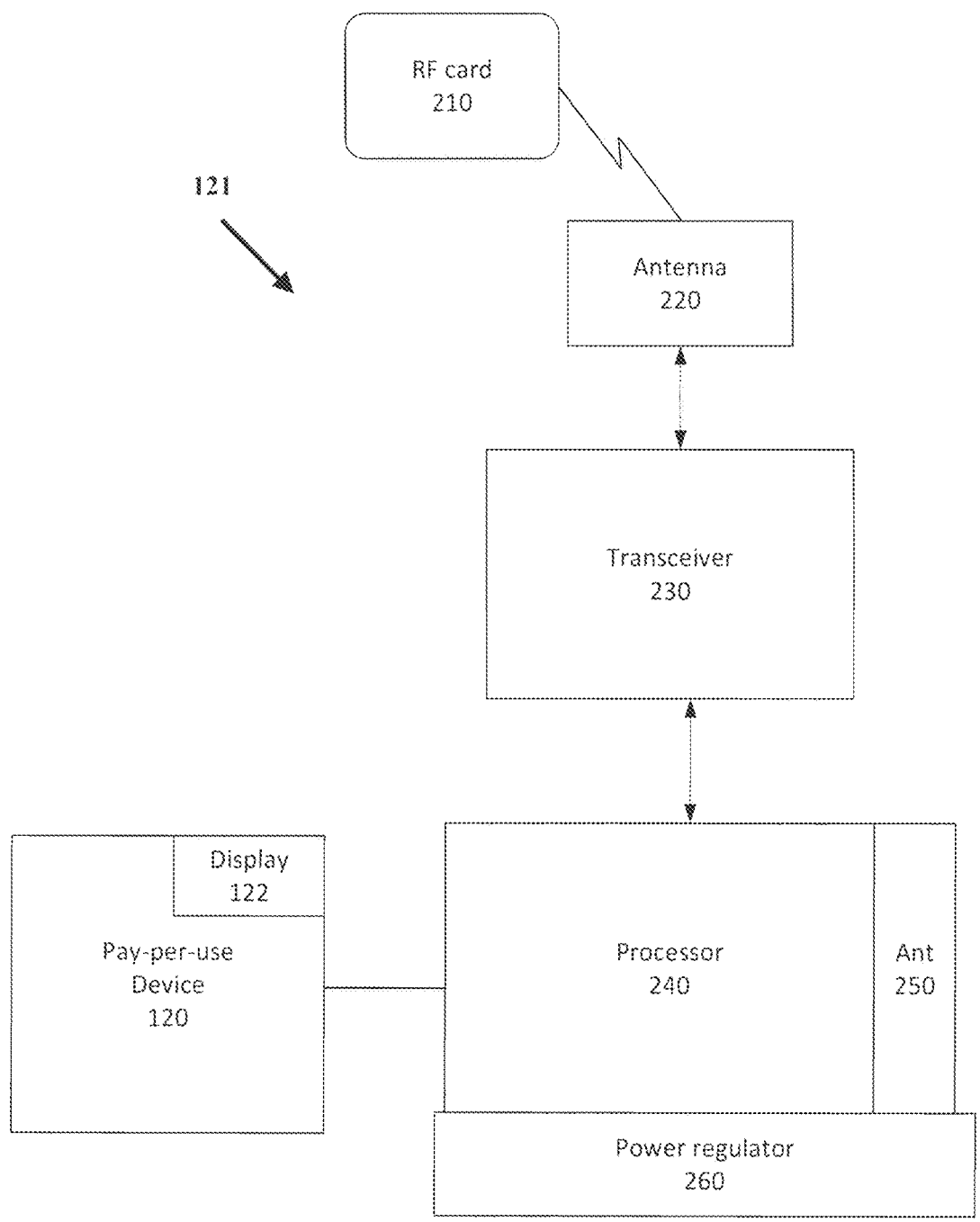
FIG. 2 is a block diagram depicting an illustrative reader device diagram for use with an illustrative embodiment.

FIG. 2 depicts an illustrative reader device diagram for use with an illustrative embodiment. Reader 121 may attach directly to pay-per-use device 120. Reader 121 may be plug-and-play in that when first powered on, the reader 121 may ask pay-per-use device 120 for identification. In the case of a washing machine, for example, the identification code may be '33' (from the manufacturer specification data stored on server 150), for example, which may inform the reader that it is, for example, an 'MDC top load washer.' Reader 121 may send code 33 through BOW 110 to server 150 which may return the machine setup data (see e.g., FIG. 11, 1110, 1120, 1130) for a code 33 machine which may include vend price, operation time, etc. Once the machine setup data is received, the machine may be ready for service.

Reader 121 may interface with most any pay-per-use device 120 such as electronic laundry machines. Reader 121 may be considered 'plug and play.' When the reader 121 is first powered up after being installed in a machine it may send a request for setup information to server 150 via a Z-Link (e.g., Zigbee (which implements additional security on top of the security provided by IEEE 802.15.4)) transceiver, for example, to enable transmission through BOW 110. BOW 110 may receive the communication and may add a 6LoWPAN transmission protocol, for example, to enable sending data to server 150. Server 150 may retrieve and interrogate the machine setup data 165 and may return the appropriate setup data to the machine. The pay-per-use device 120 may now be ready for use.

Reader 121 may include a processor 240, transceiver 230, antenna 220, antenna 250, and/or power regulator 260. Reader 121 may also be coupled to a start button. The start button may transmit a signal in response to a user action.

Processor 240 may include a processor and a transceiver such as ATmega128 RFA1 (manufactured by Atmel) which may be a main processor plus a Zigbee 2.4 GHz radio in the same chip. Processor 240 may communicate with a transceiver in BOW 110. Processor 240 may contain a boot loader allowing, for example, server 150 to download any software updates online for processor 240. Processor 240 may transmit using antenna 250, which may be a 2.4 GHz antenna. Antenna 250 may be embedded in the same circuit as processor 240.

Power regulator 260 may regulate power for reader 121. Power regulator may be, for example, a 3.6 volt power regulator.

Transceiver 230 may be used to accommodate transmission from an RF input device. Transceiver 230 may support various International Standards Organization (ISO) standard RF protocols such as ISO14443 A/B, ISO15693 and IEEE 18000. Transceiver 230 may include a TI S6700 and/or MFRC523. Processor 240 may communicate using transceiver 230 to, for example, chip card 210 or similar device through antenna 220. Any card or input device complying with these standards can provide input to the reader. Antenna 220 may be, for example, a 13.56 MHz antenna.

Reader housing may include plastic injected molded parts assembled without metal inserts or screws to hold electronic circuit boards (e.g., processor 240, transceiver 230, antenna 220, antenna 250, and/or power regulator 260).

Reader 121 may receive an interrogate command from server 150. In response to the interrogate command, reader 121 (e.g., via processor 240) may collect diagnostic information about pay-per-use device 120. Collected diagnostic information may be transmitted to server 150.

Figure 3:
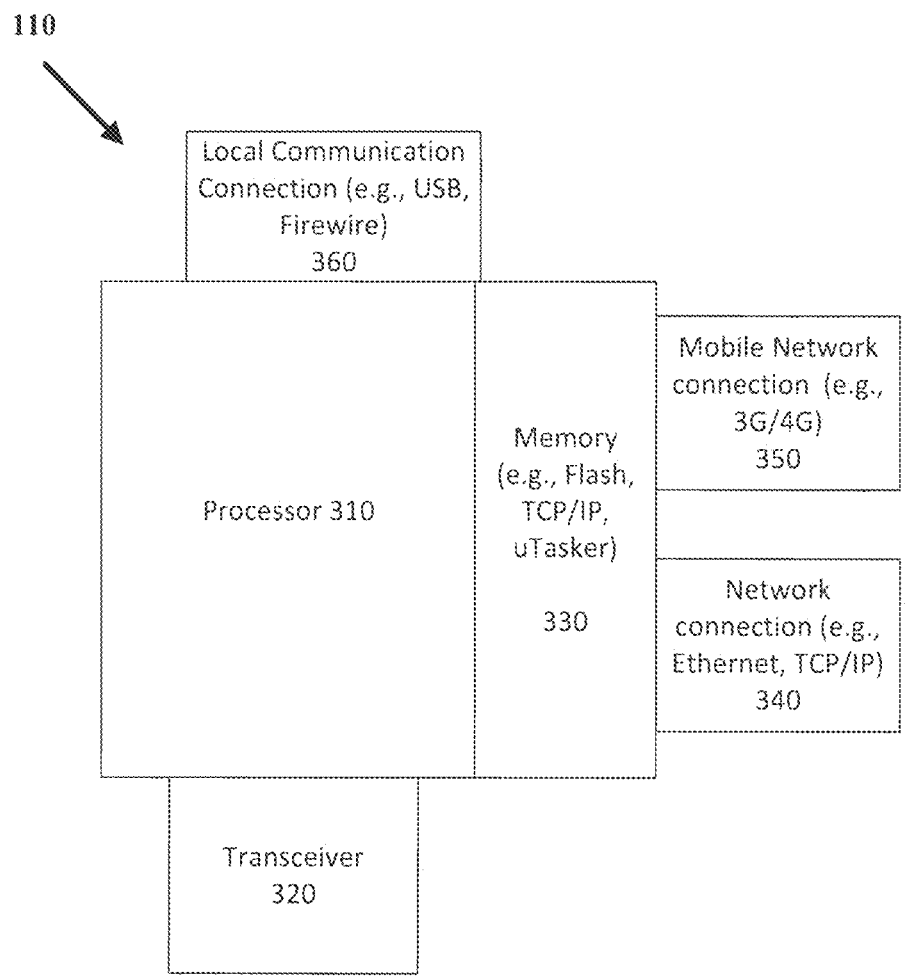
FIG. 3 is a block diagram depicting an illustrative box on the wall (BOW) device diagram for use with an illustrative embodiment.

FIG. 3 illustrates an illustrative BOW 110 device diagram for use with an illustrative embodiment. BOW 110 may include processor 310, transceiver 320, Memory 330, network connection 340, mobile network connection 350, and/or local communication connection 360.

Memory 330 may contain a real time operating system (RTOS) such as .mu.Tasker. .mu.Tasker may have an operating system with a TCP/IP stack and USB support to assist in communication through local communication connector 360 (e.g., USB), mobile network 350, and/or Ethernet 340.

BOW 110 may act as a concentrator and coordinator for multiple readers 121. BOW 110 may also processes data packets to and from server 150. BOW 110 may be the central control for transactions between readers 121 and server 150.

Processor 310 may be connected to transceiver 320, uTasker 330, network connection 340, mobile network connection 350, and/or local communication connection 360. In one embodiment, processor 310 may be, for example a AVR32UC3A1 processor manufactured by Atmel. Processor 310 may format the reader data stream (e.g., by adding XML tags) before transmitting data packets (e.g., via the Simple Object Access Protocol) to server 150 via mobile network connection 350 and/or network connection 340. Processor 310 may also receive and process all data coming from server 150 which it then directs to the appropriate reader 121.

Transceiver 320 may also be a processor/transceiver such as the AT86RF231 which may include a Zigbee radio. Transceiver 320 may communicate with a similar transceiver 230 on reader 121, for example.

Figure 4:
FIG. 4 depicts an illustrative HyperTerminal screen shot for use with an illustrative embodiment.

FIG. 4 depicts an illustrative HyperTerminal screen shot 400 for use with an illustrative embodiment. HyperTerminal or other communication utility, such as Telnet, may be used as a system checking tool. For example, server communication test 410 checks to ensure server 150 is accessible. Server 150 may be inaccessible for a number of reasons, for example, the connection to internet 140 could be down, server 150 may be disconnected from internet 140, etc. Menu 420 may bring up the HyperTerminal available options. Ping all nodes 430 may allow a user to 'ping" all nodes/readers 121 in the system. Ping a node 440 may allow a user to ping an individual node or reader 121. Reset BOW 450 may reset the BOW 110. Reader Firmware version 460 may determine the software version within a reader 121. Maximum transmit power 470 may allow transmit power of BOW 110 to be selected. Clear reader EEPROM 480 may clear the EEPROM of reader 121.

Figure 5:
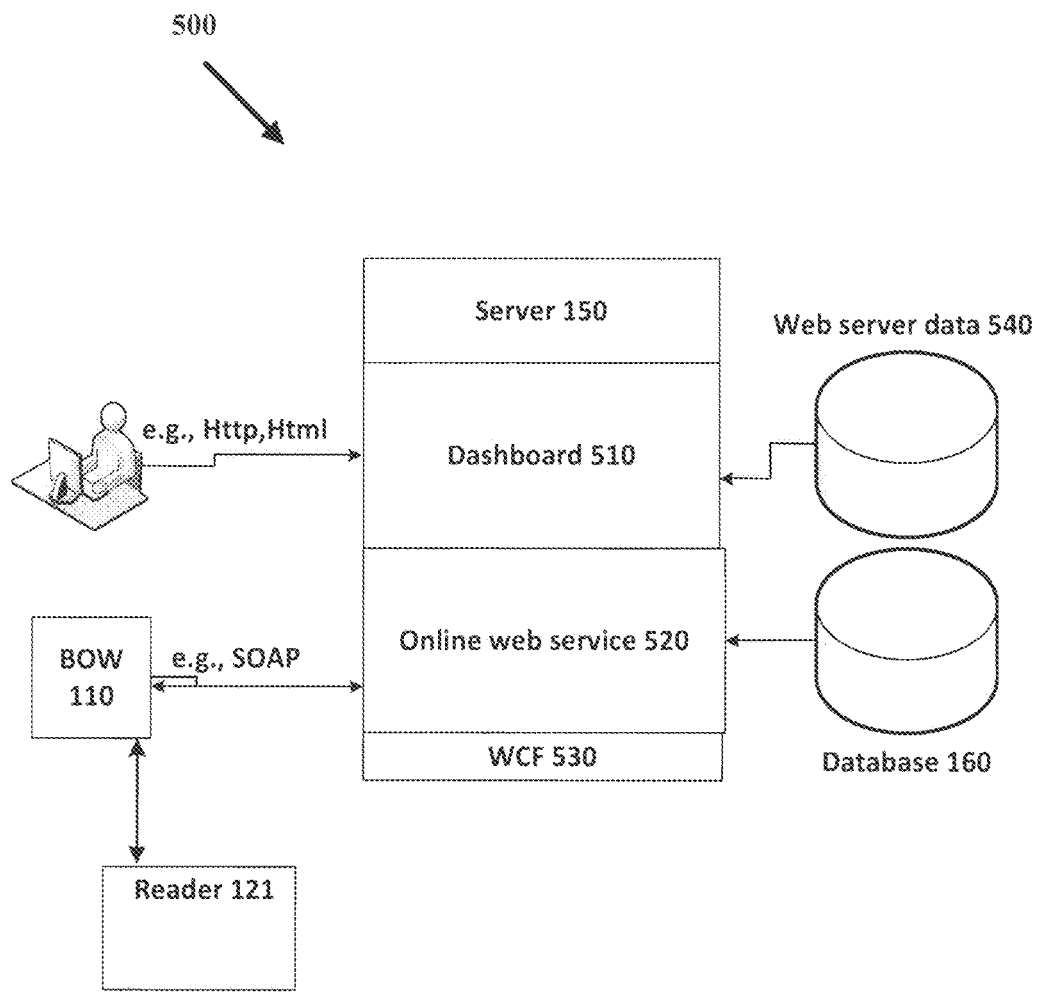
FIG. 5 is a block diagram depicting an illustrative server for use with an illustrative embodiment.

FIG. 5 depicts an illustrative server diagram 500 for use with an illustrative embodiment. Server diagram 500 may include server 150, dashboard 510, online web service 520, WCF 530, web server data 540, and/or database 160.

In an embodiment, server 150 may run on a hosted server built on the basis of the Microsoft Internet Information System (IIS), ASP.net and may use WCF service to communicate with database 160 (e.g., a relational database). Database 160 may store all application data such as customers 161, locations 162, manufacturers 163, machine types 164, machine setups 165, setup details 166, transaction logs 167, etc.

Dashboard 510 may allow a user or systems administrator, for example, to interface with server 150 for system maintenance, for example. Dashboard 510 may allow retrieval of data stored in database 160 such as customer data 161, location data 162, manufacturer data 163, machine type data 164, machine setup data 165, setup detail data 166, transaction logs 167, etc.

Online web service 520 may facilitate transactions between BOW 110 and server 150. In an embodiment, online web service 520 may be based on WCF (Windows Communication Foundation) 530 which may be the API used by ASP.net framework, for example.

In one embodiment, web server data 540 may include transaction information. Web server data 540 may be stored data in a relational database. Web server data 540 may be stored in database 160 or in a separate database. Database 160 may store tables while web server data 540 may include transaction information.

A request for reader 121 setup incoming to server 150 may include a location identification, a manufacturer identification, the machine code and reader 121 identification, for example. BOW 110 may provide the location identification. As an alternative, BOW 110 may provide the IP address and a reverse lookup in the database may determine the location identification. Reader 121 may provide manufacturer identification. Alternatively, reader 121 may provide a manufacturer name and a reverse lookup in the database can determine the manufacturer identification. Reader 121 may provide the machine code by retrieving it from the connected pay-per-use device 120 (see e.g., FIG. 11).

When server 150 receives a request, it may check the reader identification. If the reader identification is 0 (e.g., not previously setup reader), server 150 may query the locations table by using the location identification provided, get the next reader identification, assign it to the reader by modifying the incoming reader identification to that value, and increase the next reader identification value by one. If the incoming reader identification is greater than zero, no modifications may be done to the reader identification. The reader identification may be echoed back in the response message. This process helps make Reader 121 "plug and play".

Other system messages/requests may follow a similar path. For example, a Get-Balance request may start with a user supplying identification using input device 123 (e.g., waving an RF card) connected to reader 121. Reader 121 may send the message to BOW 110. BOW 110 may relay the message using the Simple Object Access Protocol (SOAP) over a communications protocol (e.g., HTTP) to server 150. Server 150 may query database 160. Server 150 may forward the result back to BOW 110. BOW 110 may forward the response to reader 121. Reader 121 may show the user account balance on display 122.

A user may access their account balance from, for example, dashboard 510 which may also access transaction logs 167, for example, in database 160.

Illustrative Processing

Figure 6:
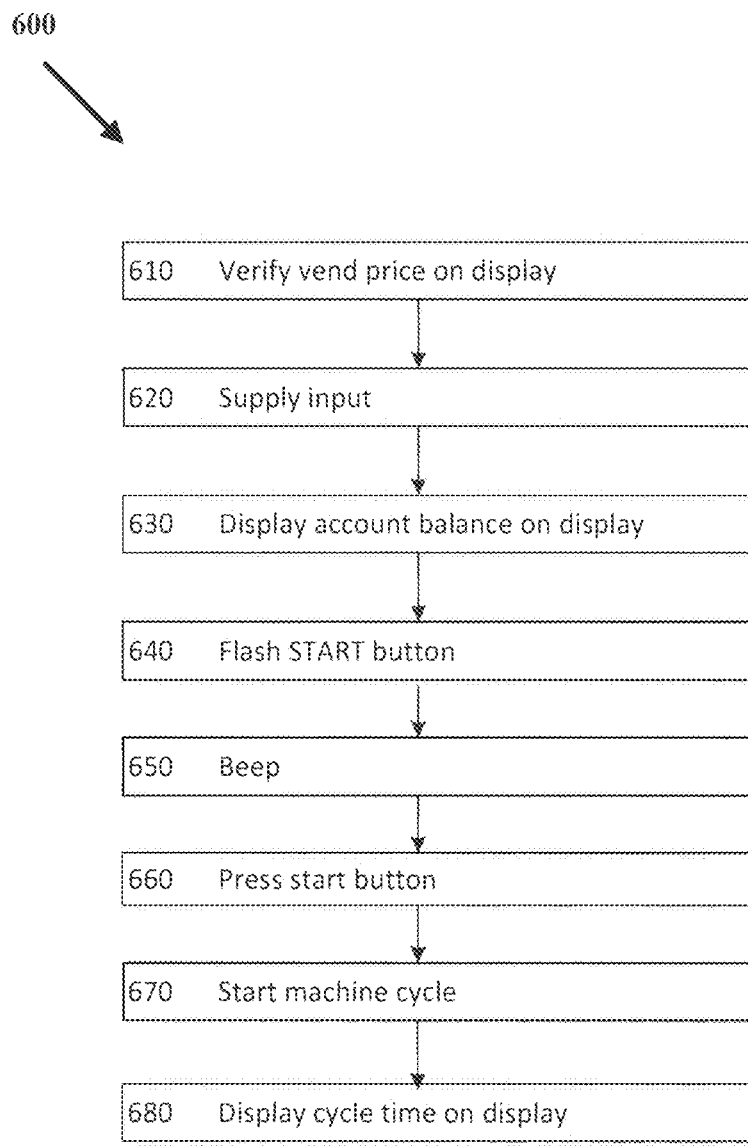
FIG. 6 depicts an example flowchart describing end-user processing performed in an illustrative embodiment.

FIG. 6 depicts an example flowchart 600 describing end-user processing performed in an illustrative embodiment. In a laundry machine embodiment, a user may first verify the vend price on display 122 (block 610).

A user may supply input (block 620) using input device 123. For example, a user may wave a card over the RF symbol. The user input may be sent as a request through BOW 110 to server 150. Since the machine reader may be already setup with a vend price, the request may be interpreted as a service request. The request may be received by server 150 which may initiate a database 160 lookup of the user account to determine if the user has sufficient funds in their account to pay for the requested service.

The user's account balance may appear on display 122 (block 630). Display 122 may show the user's account balance. The user may load the pay-per-use device 120 by, for example, waving the RF card over the reader symbol again.

The pay-per-use device 120 may flash a start button (e.g., LED) (block 640). If the user's account balance is sufficient to cover the vend price, server 150 may send a command to reader 121 to flash the START button on pay-per-user device 120. If the account balance is insufficient, a "low funds" message may be displayed on display 122.

The pay-per-use device 120 may beep several times (block 650). The pay-per-use device 120 may beep to alert the user to press the start button to activate pay-per-use device 120.

The user may press the start button (block 660). A request may be sent to server 150 to deduct the vend price from the user's account. The server 150 may then send a start command to reader 121.

The pay-per-use device 120 may start (block 670). Display 122 may display the new updated account balance.

Display 122 may show the cycle time (block 680). The displayed cycle time may continuously be decremented until the pay-per-use device 120 cycle is completed (e.g., the wash/dry is complete, the parking meter runs out of time, etc.).

Figure 7:
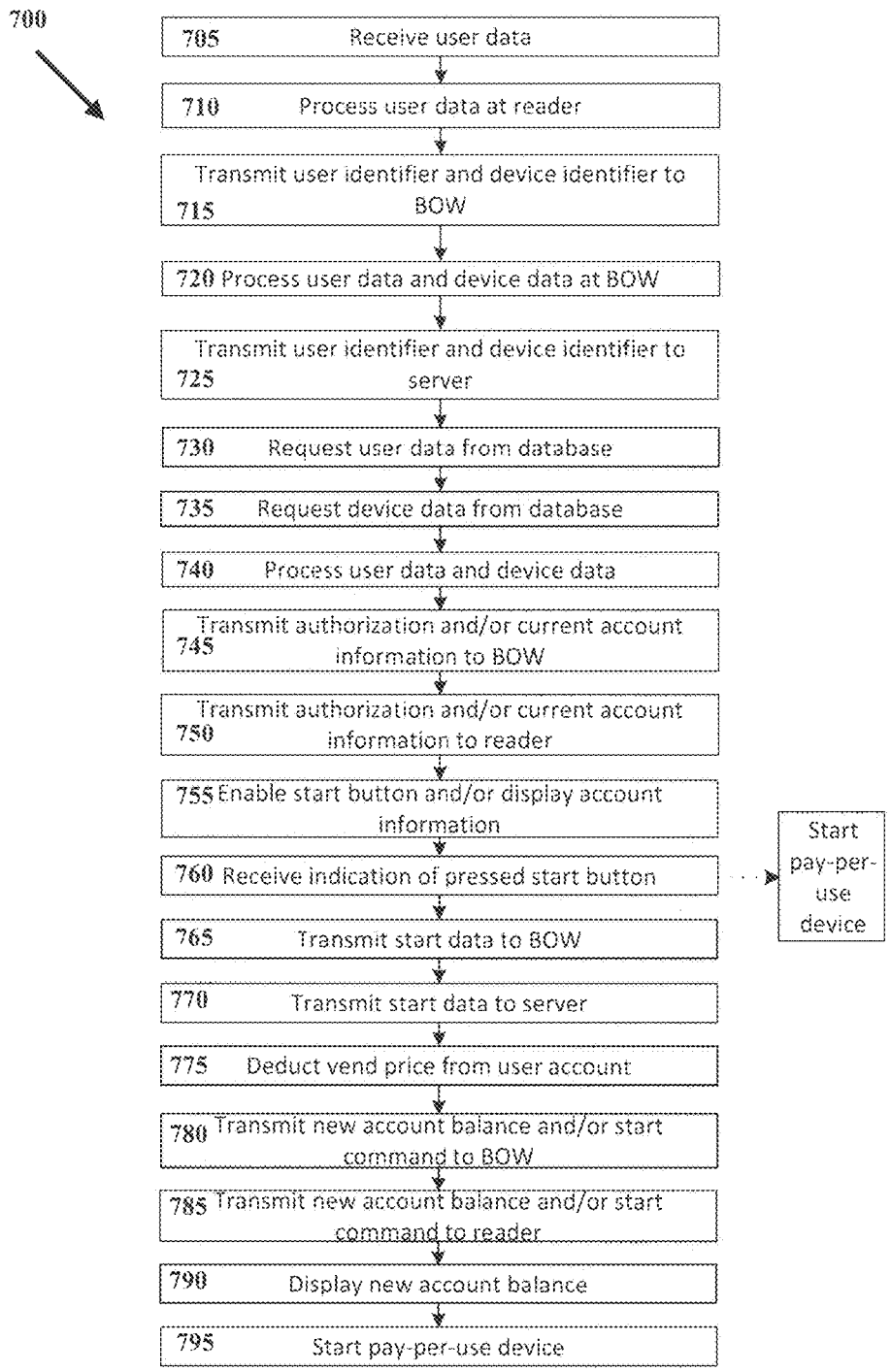
FIG. 7 depicts an example flowchart describing system processing performed in an illustrative embodiment.

FIG. 7 depicts an example flowchart 700 describing system processing performed in an illustrative embodiment.

User data may be received (block 705). A user may supply input such as user identification using input device 123. For example, a user may wave a card over the RF symbol.

User data may be processed at reader 121 (block 710). Reader 121 may analyze and process received user data.

User identifier and device identifier may be transmitted to BOW 110 (block 715). Reader 121 may transmit the received user information and reader 121 and/or pay-per-use device 120 information to BOW 110.

User data and device data may be processed at BOW 110 (block 720). Received data may be processed for transmission to server 150. Processing may include formatting the received data for use with various protocols (e.g., TCP/IP, HTTP, etc.).

User identifier and device identifier may be transmitted to server 150 (block 725). BOW 110 may transmit user and pay-per-use device 120 data to server 150.

User data may be requested from database 160 (block 730). Server 150 may receive user and pay-per-use device 120 data from BOW 110. Once received, server 150 may process the data for user and device identification. With the user identification, user data may be requested from database 160. User data from database 160 may include user account information.

Device data may be requested from database 160 (block 735). Server 150 may request device information from database 160 using the device identifier. Device information from database 160 may include vend price.

Process user data and device data (block 740). Server 150 may process the user data and device data retrieved from database 160. Server 150 may analyze the user account information to determine if the user has enough funds in the account to pay the vend price.

Authorization and/or current account information may be transmitted to BOW 110 (block 745). If the user can pay the vend price, an authorization may be transmitted to BOW 110 from server 150. If the account balance is insufficient to pay the vend price, data indicating low funds may be transmitted to BOW 110 from server 150.

Authorization and/or current account information may be transmitted to reader 121 (block 750). If the user can pay the vend price, an authorization may be transmitted from BOW 110 to reader 121. If the account balance is insufficient to pay the vend price, data indicating low funds may be transmitted to reader 121 from BOW 110.

Start button may be enabled and/or account information may be displayed (block 755). If an authorization is received by reader 121, the start button may be enabled. The start button light may flash on pay-per-user device 120 and/or account balance may be displayed on display 122. If the account balance is insufficient, a "low funds" message may be displayed on display 122 and the start button light may not flash.

Indication of pressed start button may be received (block 760). If the user presses the start button, reader 121 may receive an indication of the pressing of the start button. In one embodiment, once the start button is pressed, pay-per-user device 120 may begin operation.

Start data may be transmitted to BOW 110 (block 765). Reader 121 may transmit an indication that the start button was pressed to BOW 110.

Start data may be transmitted to server 150 (block 770). BOW 110 may transmit an indication that the start button was pressed to server 150.

Vend price may be deducted from user account (block 775). Server 150 may deduct the vend price from the user account.

New account balance and/or start command may be transmitted to BOW 110 (block 780). Server 150 may transmit the user's new account balance to BOW 110.

New account balance and/or start command may be transmitted to reader (block 785). BOW 110 may transmit the user's new account balance to reader 121.

New account balance may be displayed (block 790). Reader 121 may display new account balance on display 122.

Pay-per-use device 120 may start (block 795). Pay-per-use device 120 may begin operation once start command is received from server 150.

Figure 8:
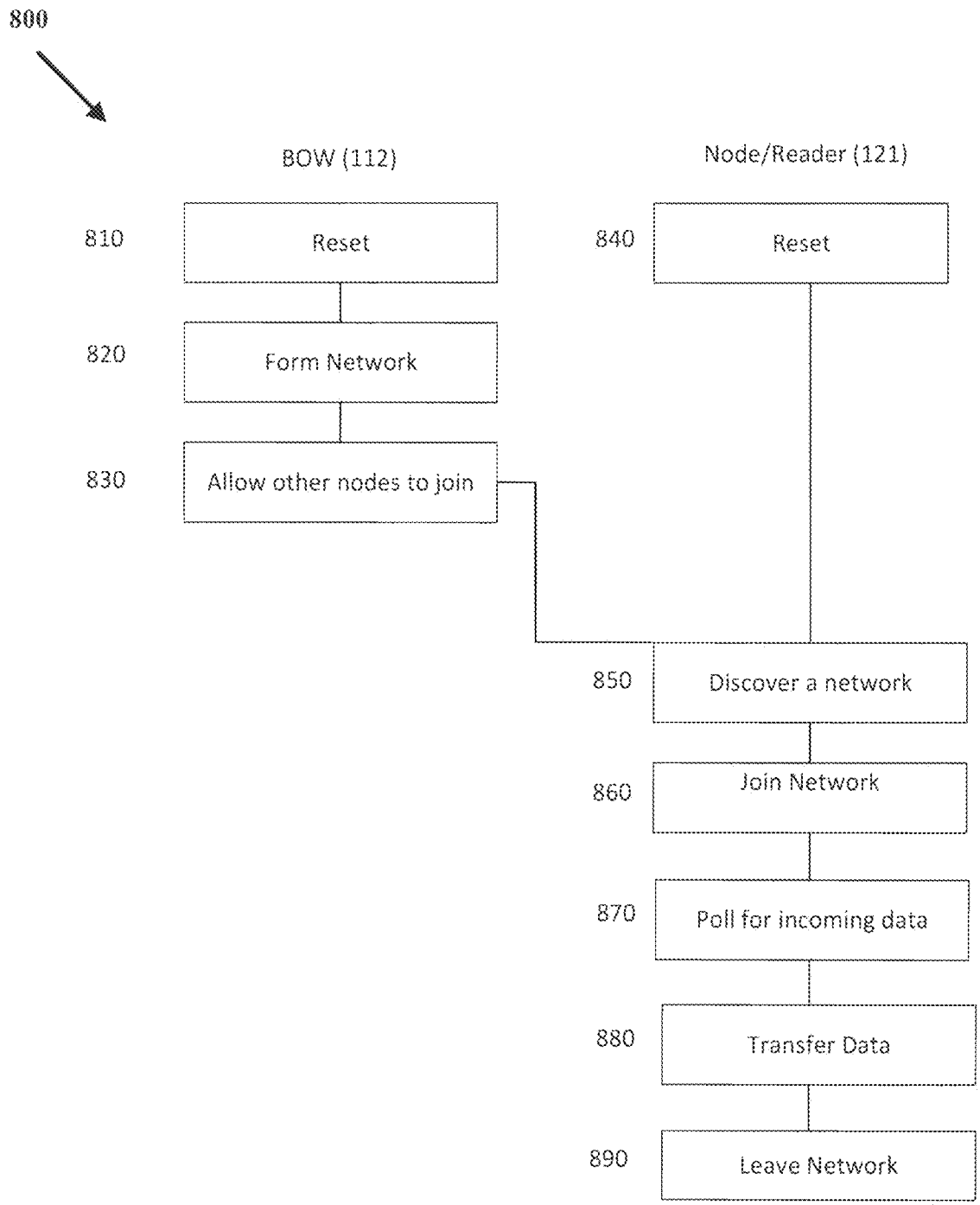
FIG. 8 illustrates an example flowchart describing network formation performed in an illustrative embodiment.

FIG. 8 illustrates an example flowchart describing network formation performed in an illustrative embodiment. BOW 110 may initiate 810 and form a network 820 and may allow or request a reader 121 to join 830. Since BOW 110 forms a "mesh" network with all readers 121 it may also maintain a parent child relationship within the network. Reader 121 may discover the network 850 and join the network 860. Reader 121 may poll for incoming data 870 from either reader 121 or server 150 and may manage the transfer of data 880 between them. Reader 121 may then vacate or leave the network 890 allowing others to join. In an example embodiment, BOW 110 network limitation may be approximately 1100 transactions per minute. Thus, a plurality of readers may join the network.

Reader 121 may reset (block 840). After a transaction, reader 121 may reset itself to be ready for the next transaction.

EXAMPLE EMBODIMENTS

FIG. 9 depicts example reader setup data performed in an illustrative embodiment. Pay-per-use device 120 manufacturer may issue a data packet specification for their machine. Manufacturer's specification table 940 may be for a "top load washer," for example. Manufacturer's specification table 940 may describe the number of bytes used for each function of a machine. In one embodiment, an online system may use only three functions from the data packet, for example. The first of the three functions may be 'key press wait time' 910 which may be used, for example, to specify the number of seconds a user has to press the start key after the system has deducted the vend price and flashed the LED on the start button. The second may be the 'vend price' 920 which may inform the user how much the system will charge 'per use' of the pay-per-use device 120. The third item may be the 'cycle length' 930 which is the length of time the cycle will run, for example, 30 minutes for a wash or dry cycle.

Figure 10:
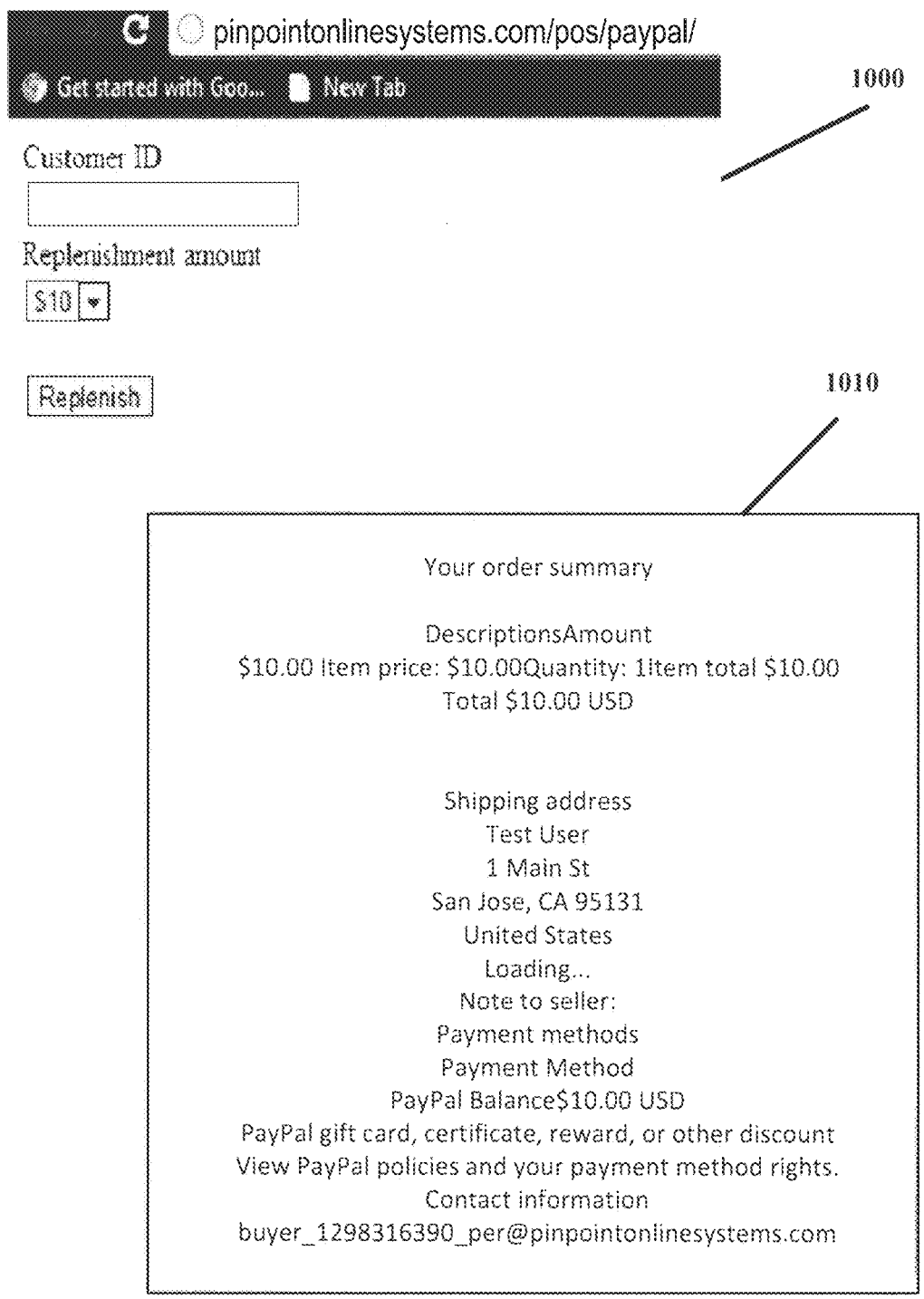
FIG. 10 depicts example screen shots for replenishing an account in an illustrative embodiment.

FIG. 10 depicts example screen shots 1000 and 1010 for replenishing an account in an illustrative embodiment. As shown in screen shot 1000, a user may go online to a 'route operator' website, for example, and enter their customer ID and choose an amount to be added to their account. The user may press a 'replenish' button, for example, and may be directed to a payment processor such as PayPal where the user may use a credit card or their own PayPal account, for example, to transfer the selected amount to their laundry account. Screen shot 1010 shows an example confirmation screen where $10.00 was accepted for credit into a pay-per-use device account.

In other embodiments, a user may place money in their account via cash, check or credit card or a call center may allow the transaction with preapproved credit.

Alternatively, a user may complete a payment form on the operator website to set up an account. A user may choose to enter $5, $10 or $20, etc. Contacting the 'operator call center' and providing an account number and credit card is also an option.

Open an account or add to an existing account and charge the amount to a mobile phone account by text message using 'PAYMO' Text-PayMe, Obopay, Paypal-Mobile or a similar service may also be available.

Cash may also be an option by providing an amount ($5, $10 or $20, etc.) to the apartment manager, participating convenience store or a designated trusted person, for example, who in turn provides a form of payment to a route operator Call Center (CC). The user may validate the transaction by seeing the balance on a reader.

A prepaid account may also be an option. Cash, check or credit may have been received in advance by the CC to establish an account. A user may also set up a short term account as required such as when on vacation or on a temporary duty assignment.

Alternatively, cash at an add-value station may be available. An operator my elect to place a bill acceptor/add-value station in an apartment laundry room or other location to facilitate adding value to an account. If the station includes a 'bill acceptor' the station must be serviced regularly to reduce vandalism and loss of contents.

Diagnostics and System Maintenance Embodiments

Figure 11:
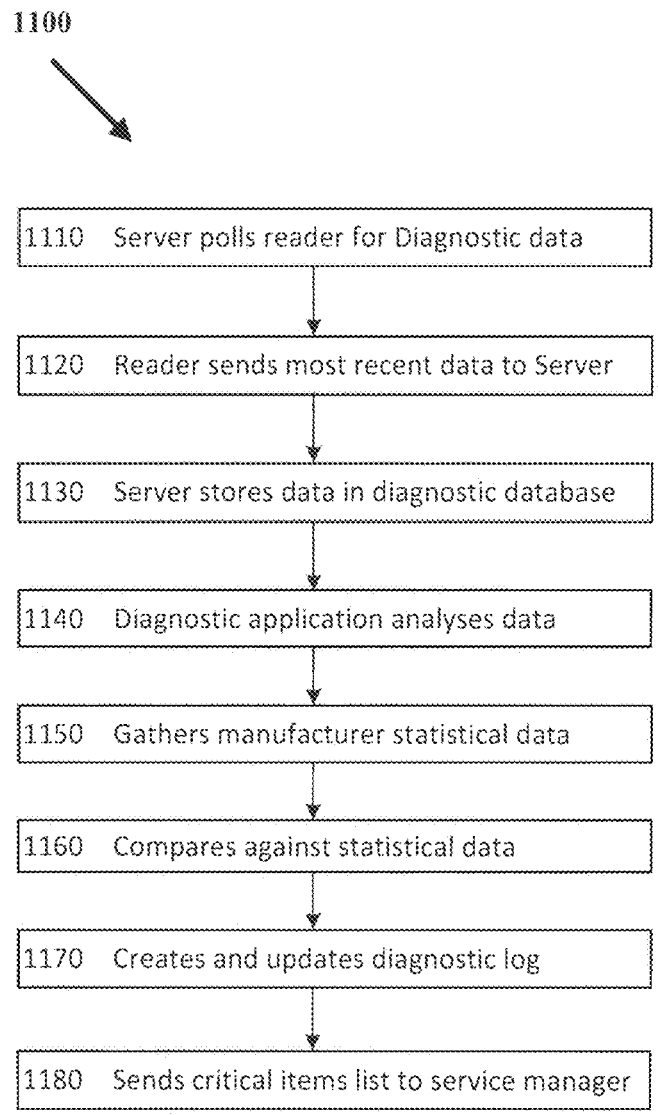
FIG. 11 depicts an example flowchart describing diagnostic processing performed in an illustrative embodiment.

FIG. 11 depicts an example flowchart 1100 describing diagnostic processing performed in an illustrative embodiment. An added function to the system may be the capability of extracting data from pay-per-use device 120 and processing the data using a separate analytical application in server 150.

Server 150 may collect audit data from each machine via the attached reader 121 (block 1110).

Reader 121 may send diagnostic data to server 150 (block 1120).

Server 150 may store the data in a diagnostic database (block 1130). Diagnostic database may be database 160, for example.

Server 150, running a diagnostic application, may analyze the diagnostic data (block 1140).

Server 150 may process the diagnostic data against statistical data from the machine manufacturer (block 1150).

Server 150, running the diagnostic application, may compare the data received from the machine against most recent statistical data (block 1160).

Server 150 may update the diagnostic transaction log (block 1170).

Server 150 may determine the failure rates of various components of pay-per-use device 120 and may inform technicians (block 1380). Technicians may receive a notification on, for example, their mobile devices as to what remedial action may be required.

Using the combination of the data from the transaction log and the HyperTerminal 400, technicians may determine what actions may be required to correct some issues related to failed transactions etc. For example one may 'ping' all reader nodes in the system or just individual nodes to ensure they are actually online. In addition, by entering "v" in the terminal may show, for example, the current version of software that is in the reader and as necessary download a newer version.

BOW 110 may be reset from the HyperTerminal 400 and an updated version of software may be sent as required. System issues may be resolved using this diagnostic aid. Processors 310 and 240 in readers 121 and BOW 100, respectively, may have "Boot Loaders" allowing for updates to be sent directly to any reader in the system.

A critical function required by the commercial laundry industry may be when a 'route operator' wants to update the vend price on all machines at a specific location. An administrator may simply update the vend price in server 150 and send a command to BOW 110 to update readers in that location when they are available.

An additional benefit of being online is that the overall system status can be assessed form any laptop, iPad or mobile device from the Internet.

Illustrative Computer System

Figure 12:
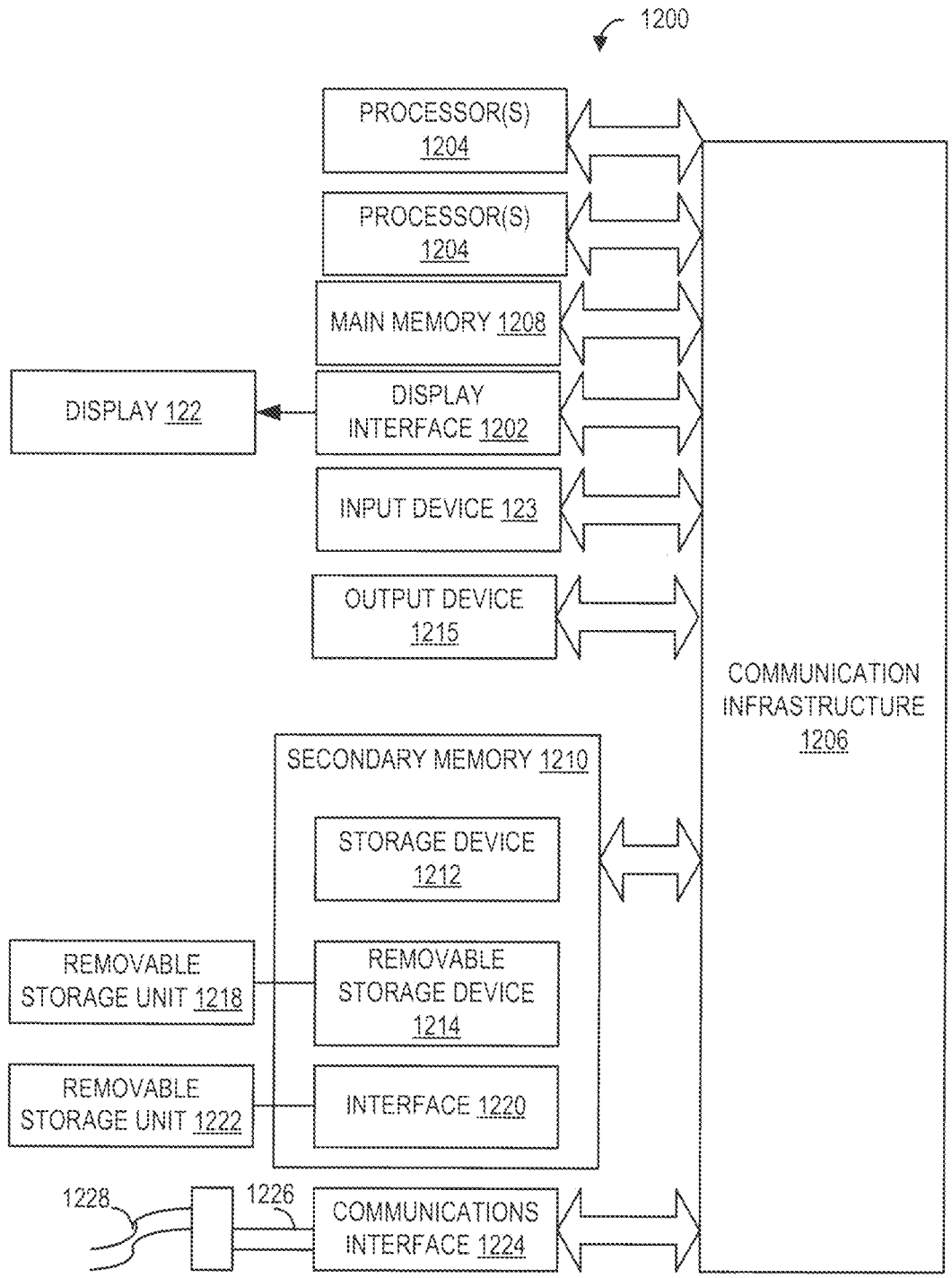
FIG. 12 depicts an example functional flowchart that may be used in implementing an illustrative embodiment of the present invention.

FIG. 12 depicts an illustrative computer system that may be used in implementing an illustrative embodiment of the present invention. Specifically, FIG. 12 depicts an illustrative embodiment of a computer system 1200 that may be used in computing devices such as, e.g., but not limited to, standalone or client or server devices. FIG. 12 depicts an illustrative embodiment of a computer system that may be used as client device, or a server device, etc. The present invention (or any part(s) or function(s) thereof) may be implemented using hardware, software, firmware, or a combination thereof and may be implemented in one or more computer systems or other processing systems. In fact, in one illustrative embodiment, the invention may be directed toward one or more computer systems capable of carrying out the functionality described herein. An example of a computer system 1200 is shown in FIG. 12, depicting an illustrative embodiment of a block diagram of an illustrative computer system useful for implementing the present invention. Specifically, FIG. 12 illustrates an example computer 1200, which in an illustrative embodiment may be, e.g., (but not limited to) a personal computer (PC) system running an operating system such as, e.g., (but not limited to) MICROSOFT® WINDOWS® NT/98/2000/XP/Vista/Windows 7/etc. available from MICROSOFT®. Corporation of Redmond, Wash., U.S.A. or an Apple computer executing MAC® OS from Apple® of Cupertino, Calif., U.S.A. However, the invention is not limited to these platforms. Instead, the invention may be implemented on any appropriate computer system running any appropriate operating system. In one illustrative embodiment, the present invention may be implemented on a computer system operating as discussed herein. An illustrative computer system, computer 1200 is shown in FIG. 12. Other components of the invention, such as, e.g., (but not limited to) a computing device, a communications device, a telephone, a personal digital assistant (PDA), an iPhone, a 3G wireless device, a wireless device, a personal computer (PC), a handheld PC, a laptop computer, a smart phone, a mobile device, a netbook, a handheld device, a portable device, an interactive television device (iTV), a digital video recorder (DVR), client workstations, thin clients, thick clients, fat clients, proxy servers, network communication servers, remote access devices, client computers, server computers, peer-to-peer devices, routers, web servers, data, media, audio, video, telephony or streaming technology servers, etc., may also be implemented using a computer such as that shown in FIG. 12. In an illustrative embodiment, services may be provided on demand using, e.g., an interactive television device (iTV), a video on demand system (VOD), via a digital video recorder (DVR), and/or other on demand viewing system.

The computer system 1200 may include one or more processors, such as, e.g., but not limited to, processor(s) 1204. The processor(s) 1204 may be connected to a communication infrastructure 1206 (e.g., but not limited to, a communications bus, cross-over bar, interconnect, or network, etc.). Processor 1204 may include any type of processor, microprocessor, or processing logic that may interpret and execute instructions (e.g., for example, a field programmable gate array (FPGA)). Processor 1204 may comprise a single device (e.g., for example, a single core) and/or a group of devices (e.g., multi-core). The processor 1204 may include logic configured to execute computer-executable instructions configured to implement one or more embodiments. The instructions may reside in main memory 1208 or secondary memory 1210. Processors 1204 may also include multiple independent cores, such as a dual-core processor or a multi-core processor. Processors 1204 may also include one or more graphics processing units (GPU) which may be in the form of a dedicated graphics card, an integrated graphics solution, and/or a hybrid graphics solution. Various illustrative software embodiments may be described in terms of this illustrative computer system. After reading this description, it will become apparent to a person skilled in the relevant art(s) how to implement the invention using other computer systems and/or architectures. Processor 1204 may include processor 240 and/or processor 310.

Computer system 1200 may include a display interface 1202 that may forward, e.g., but not limited to, graphics, text, and other data, etc., from the communication infrastructure 1206 (or from a frame buffer, etc., not shown) for display on the display unit 122. The display until 122 may be, for example, a television, a computer monitor, or a mobile phone screen. The output may also be provided as sound through a speaker.

The computer system 1200 may also include, e.g., but is not limited to, a main memory 1208, random access memory (RAM), and a secondary memory 1210, etc. Main memory 1208, random access memory (RAM), and a secondary memory 1210, etc., may be a computer-readable medium that may be configured to store instructions configured to implement one or more embodiments and may comprise a random-access memory (RAM) that may include RAM devices, such as Dynamic RAM (DRAM) devices, flash memory devices, Static RAM (SRAM) devices, etc.

The secondary memory 1210 may include, for example, (but is not limited to) a hard disk drive 1212 and/or a removable storage drive 1214, representing a floppy diskette drive, a magnetic tape drive, an optical disk drive, a compact disk drive CD-ROM, flash memory, etc. The removable storage drive 1214 may, e.g., but is not limited to, read from and/or write to a removable storage unit 1218 in a well known manner. Removable storage unit 1218, also called a program storage device or a computer program product, may represent, e.g., but is not limited to, a floppy disk, magnetic tape, optical disk, compact disk, etc. which may be read from and written to removable storage drive 1214. As will be appreciated, the removable storage unit 1218 may include a computer usable storage medium having stored therein computer software and/or data.

In alternative illustrative embodiments, secondary memory 1210 may include other similar devices for allowing computer programs or other instructions to be loaded into computer system 1200. Such devices may include, for example, a removable storage unit 1222 and an interface 1220. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 1222 and interfaces 1220, which may allow software and data to be transferred from the removable storage unit 1222 to computer system 1200.

Computer 1200 may also include an input device 123 may include any mechanism or combination of mechanisms that may permit information to be input into computer system 1200 from, e.g., a user. Input device 123 may include logic configured to receive information for computer system 1200 from, e.g. a user. Examples of input device 123 may include, e.g., but not limited to, a mouse, pen-based pointing device, or other pointing device such as a digitizer, a touch sensitive display device, and/or a keyboard or other data entry device (none of which are labeled). Other input devices 123 may include, e.g., but not limited to, a biometric input device, a video source, an audio source, a microphone, a web cam, a video camera, and/or other camera.

Computer 1200 may also include output devices 1215 which may include any mechanism or combination of mechanisms that may output information from computer system 1200. Output device 1215 may include logic configured to output information from computer system 1200. Embodiments of output device 1215 may include, e.g., but not limited to, display 122, and display interface 1202, including displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc. Computer 1200 may include input/output (I/O) devices such as, e.g., (but not limited to) input device 123, communications interface 1224, cable 1228 and communications path 1226, etc. These devices may include, e.g., but are not limited to, a network interface card, and/or modems.

Communications interface 1224 may allow software and data to be transferred between computer system 1200 and external devices.

In this document, the terms "computer program medium" and "computer readable medium" may be used to generally refer to media such as, e.g., but not limited to, removable storage drive 1214, a hard disk installed in hard disk drive 1212, flash memories, removable discs, non-removable discs, etc. In addition, it should be noted that various electromagnetic radiation, such as wireless communication, electrical communication carried over an electrically conductive wire (e.g., but not limited to twisted pair, CATS, etc.) or an optical medium (e.g., but not limited to, optical fiber) and the like may be encoded to carry computer-executable instructions and/or computer data that embodiments of the invention on e.g., a communication network. These computer program products may provide software to computer system 1200. It should be noted that a computer-readable medium that comprises computer-executable instructions for execution in a processor may be configured to store various embodiments of the present invention. References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic.

Further, repeated use of the phrase "in one embodiment," or "in an illustrative embodiment," do not necessarily refer to the same embodiment, although they may.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments may be embodied in many different ways as a software component. For example, it may be a stand-alone software package, or it may be a software package incorporated as a "tool" in a larger software product, such as, for example, a scientific modeling product. It may be downloadable from a network, for example, a website, as a stand-alone product or as an add-in package for installation in an existing software application. It may also be available as a client-server software application, or as a web-enabled software application. It may also be part of a pay-per-use device system as described above.

Embodiments of the present invention may include apparatuses for performing the operations herein. An apparatus may be specially constructed for the desired purposes, or it may comprise a general purpose device selectively activated or reconfigured by a program stored in the device.

Embodiments may be embodied in many different ways as a software component. For example, it may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application.

While various embodiments of the present invention have been described above, it should be understood that they have been presented by way of example only, and not limitation. Thus, the breadth and scope of the present invention should not be limited by any of the above-described illustrative embodiments, but should instead be defined only in accordance with the following claims and their equivalents.

The invention claimed is:

1. A method for payment for use of laundry machines comprising: forming a mesh network with a plurality of radio frequency (RF) readers, wherein the plurality of RF readers discover the network and join the network, the mesh network in communication with an internet server, the plurality of RF readers installed in a plurality of washers or dryers, the plurality of RF readers configured to wirelessly transmit secure encrypted data; receiving, by an RF reader of the plurality of RF readers, washer or dryer setup information; configuring the at least one washer or dryer using the washer or dryer setup information; transmitting, by the RF reader, washer or dryer manufacturer vending options information, washer or dryer identification information, and washer or dryer location information to the internet server; receiving, by the RF reader, a user identification, the user identification associated with a customer of the washer or dryer, wherein the RF reader receives the user identification from an RF device, the RF device providing contactless transfer of information from a customer via radio frequency; transmitting, by the RF reader, the user identification to the internet server, wherein the internet server accesses a user account associated with the user identification, the Internet server calculating a user account balance value based on prepaid funds contributed to the user account, the prepaid funds eliminating retrieval of bills and coins from the washer or dryer; receiving, by the RF reader, the user account balance value from the internet server; displaying, by a display screen coupled to the RF reader, the user account balance; receiving, by a user interface circuit in communication with the RF reader, vending options selected by the customer; receiving by a user interface circuit or device in communication with the RF reader, a calculated vend price based on the customer selected vending options and one or more pricing tables stored on the RF reader, machine and internet server; displaying, by the display screen, the received vend price; receiving, by the user interface circuit in communication with the RF reader, a start machine request initiated by the customer; transmitting, by the RF reader, the start machine request to the internet server; receiving, by the RF reader, an updated user account balance value, wherein the updated user account balance includes the vend price deducted from the user account balance; displaying, by the display screen, the updated user account balance; starting the at least one washer or dryer by the RF reader in response to the start machine request; and transmitting, by the RF device, diagnostic data to the internet server.

2. The method of claim 1, wherein the washer or dryer setup information comprises at least one of: washer or dryer cycle time, key press wait time, temperature, or vend price.

3. The method of claim 1, wherein the mesh network is formed using at least one of Zigbee, 802.15.4, high rate WPAN, low rate WPAN, 6loWPAN, ISA100.11a, 802.11.1, WiFi, 3G, WiMAX, or 4G.

4. The method of claim 1, wherein the RF reader interfaces with radio frequency devices conforming to at least one of: an ISO standard or an IEEE standard.

5. The method of claim 1, further comprising: receiving, by the RF device, an interrogate command from the internet server; and extracting, the diagnostic data from the washer or dryer using a diagnostic circuit, based on the received interrogate command.

6. The method of claim 1, further comprising: storing usage information and diagnostic data for a plurality of washer or dryers; computing a statistical probability of a failure for the plurality of washer or dryers based on the usage information and diagnostic data; and transmitting a potential failure notification based on the statistical probability of failure.

7. The method of claim 6, further comprising: analyzing the diagnostic data; and transmitting notification of failure based on the diagnostic data.

8. The method of claim 6, wherein the storing comprises recording in a relational database a plurality of setup values for each of the plurality of washer or dryers and a plurality of operation values for each of the plurality of washer or dryers.

9. A pay-per-use system, comprising: a washer or dryer; a microprocessor coupled to the washer or dryer; a radio frequency (RF) reader coupled to the washer or dryer and electrically coupled to the microprocessor, the reader configured to receive user identification from a radio frequency device, the RF reader providing contactless transfer of information from a customer; a communications circuit electrically coupled to the microprocessor, the communications circuit configured to: transmit the user identification, washer or dryer manufacturer vending options information, washer or dryer identification information, washer or dryer location information, and a user start request to a server, receive washer or dryer setup data, and a start command from the server, the setup data used to configure the washer or dryer, and receive a customer account balance value and an updated customer account balance from a customer account associated with the user identification, wherein the customer account includes prepaid funds; a mesh network comprising a plurality of communication circuits, each of the plurality of communication circuits discovers a network and joins the network; a display screen electrically coupled to the microprocessor, the display screen configured to display the customer account balance, the updated customer account balance, with said display screen being part of a user interface circuit or device of the pay per use system in communication with the RF reader, a calculated vend price based on the customer selected vending options and one or more pricing tables stored on the RF reader, machine and internet server, the updated customer account balance includes the vend price deducted from the customer account balance;

a user interface circuit electrically coupled to the microprocessor, the user interface circuit configured to receive the user selected vending options and the user start request; a start circuit electrically coupled to the microprocessor, the start circuit configurable to enable operation of the washer or dryer in response to the start command; and a diagnostic circuit electrically coupled to the microprocessor.

10. The pay-per-use system of claim 9, wherein the setup data comprises washer or dryer cycle time, key press wait time, temperature, and vend price.

11. The pay-per-use system of claim 9, wherein the diagnostics circuit is configured to collect diagnostic information from the washer or dryer when an interrogate command is received from the server, the communications circuit further configured to transmit the diagnostic information to the server.

12. The pay-per-use system of claim 9, wherein the prepaid funds eliminate retrieval of bills and coins from the washer or dryer.

13. The pay-per-use system of claim 9, further comprising a concentrator adapted to: wirelessly communicate with the plurality of communication circuits; receive outgoing data from at least one of the plurality of communication circuits; store the outgoing data; transmit the outgoing data to the server; receive incoming data from the server; store the incoming data; and transmit the incoming data to at least one of the plurality of communication circuits.

14. The pay-per-use system of claim 9, wherein the plurality of communication circuits communicate concurrently.

15. The pay-per-use system of claim 9, wherein the RF reader interfaces with radio frequency (RF) devices conforming to at least one of: an ISO standard or an IEEE standard.

16. The pay-per-use system of claim 9, wherein said communications circuit is further adapted to: transmit and receive data using at least one of 802.15.4, high rate WPAN, low rate WPAN, 6loWPAN, ISA100.11a, 802.11.1, WiFi, 3G, WiMAX, or 4G.

17. The pay-per-use system of claim 9, wherein the reader comprises: an enclosure comprising one or more plastic injected molded parts assembled without metal inserts or screws, the enclosure housing the microprocessor.

18. The pay-per-use system of claim 9, wherein the server determines whether the customer account has a sufficient fund value.

19. The pay-per-use system of claim 9, wherein the server is further configured to store a plurality of device information in a database, the database comprising: a locations table, wherein the locations table includes columns for at least one of a name, a description, and an identification number; a manufactures table, wherein the manufacturers table includes columns for at least one of a manufacturer, a machine type, a model, a description, and a code; a machine setup table, wherein the machine setup table includes columns for at least one of a location, the code, and setup values; and a maintenance table.

\* \* \* \* \*